Nov. 1, 1966

A. T. FASSERO ETAL 3,281,892

BEAD ALIGNER FOR TIRE MOLDING APPARATUS

Filed March 16, 1964

INVENTORS
ANTHONY T. FASSERO
JAMES R. MADDOX
BY George B White
ATTORNEY

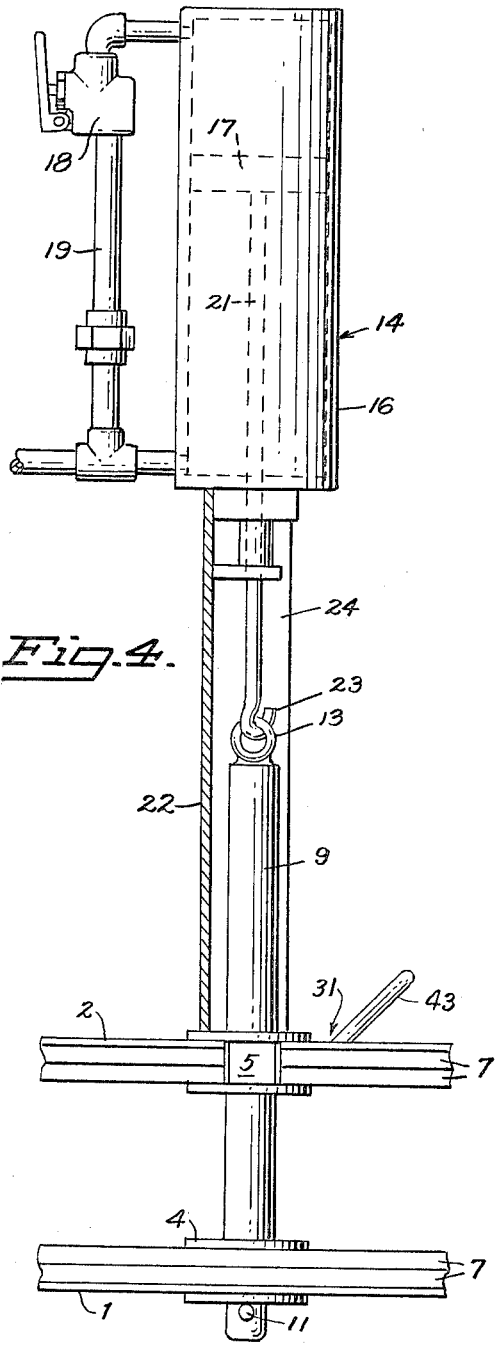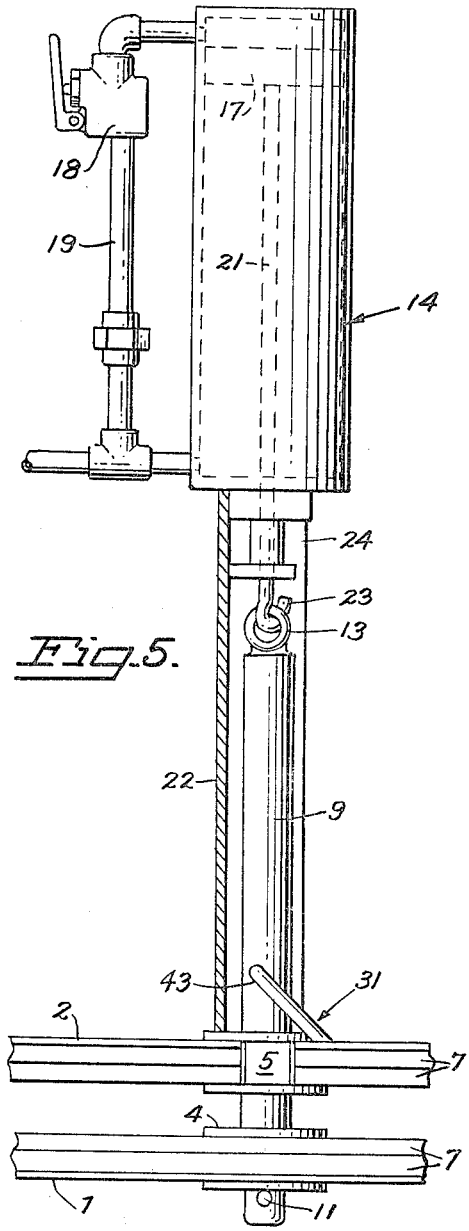

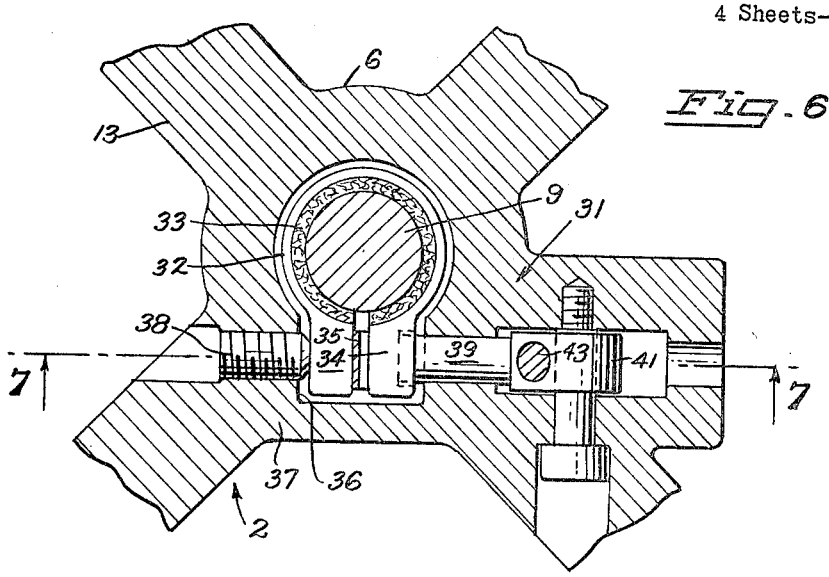
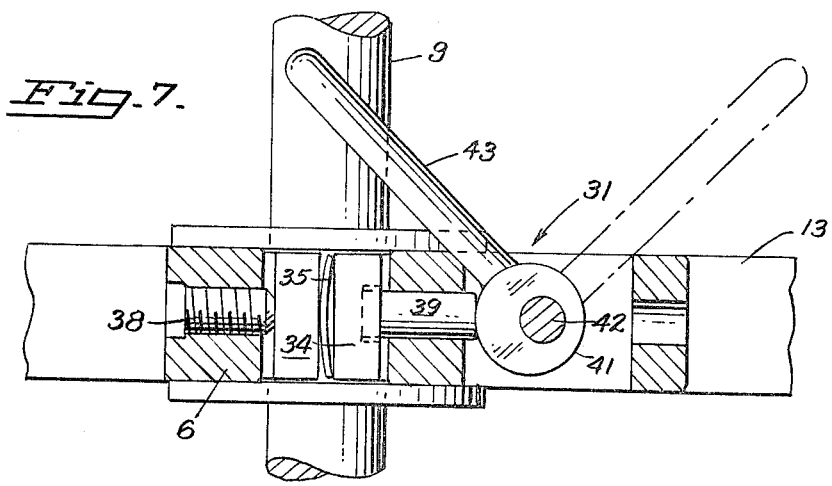
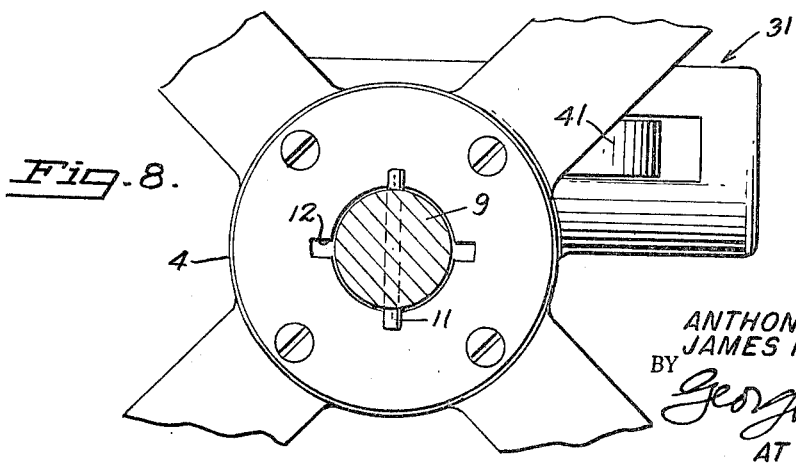

Nov. 1, 1966   A. T. FASSERO ETAL   3,281,892
BEAD ALIGNER FOR TIRE MOLDING APPARATUS
Filed March 16, 1964   4 Sheets-Sheet 4
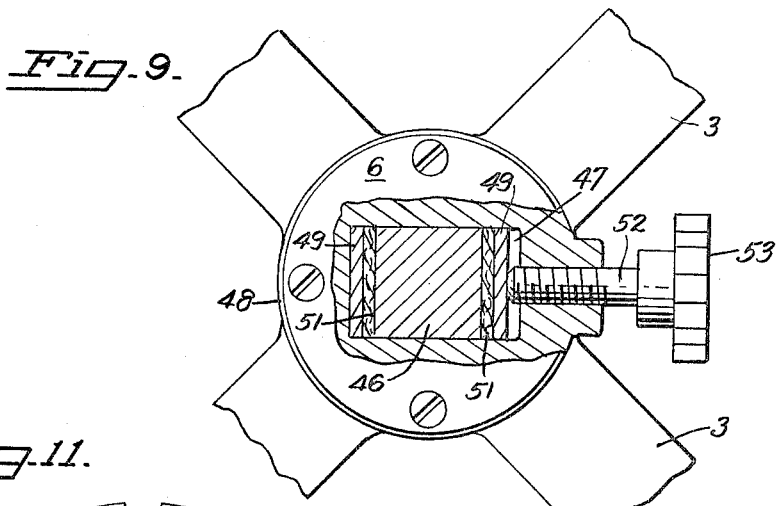
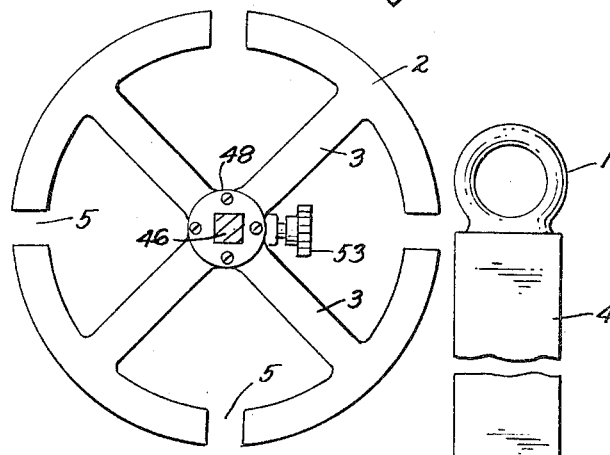
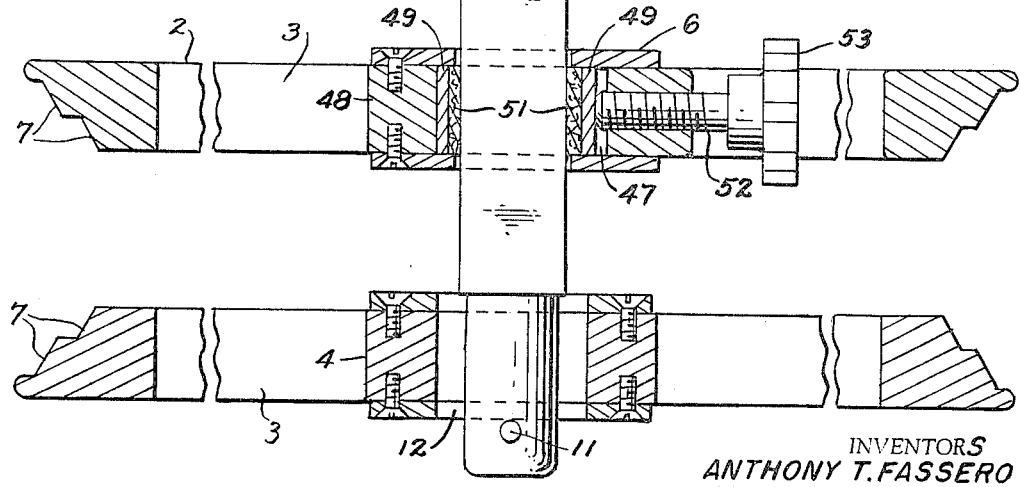
INVENTORS
ANTHONY T. FASSERO
JAMES R. MADDOX
BY George B White
ATTORNEY

United States Patent Office 3,281,892
Patented Nov. 1, 1966

3,281,892
BEAD ALIGNER FOR TIRE MOLDING
APPARATUS
Anthony T. Fassero, 194 98th Ave., Oakland, Calif., and
James R. Maddox, Oakland, Calif.; said Maddox assignor to said Fassero
Filed Mar. 16, 1964, Ser. No. 352,268
8 Claims. (Cl. 18—2)

This invention relates to a bead aligner.

Such bead aligners are utilized in handling tires in molds, particularly in properly aligning tires in recapping or retreading molds. In the operation of the handling of such tires it is necessary to compress the beads of a tire together thereby to reduce the outer periphery of the tire, but some provision must be made to allow the movement of the beads apart from one another under predetermined pressure caused by inflation of the tire. There is considerable force necessary to press the beads of a tire together and usually hydraulic or pneumatic power equipment is utilized for that purpose. In previous practice such power jacks or devices were part of the bead aligner and made the operation tedious, cumbersome and expensive.

The problems of the industry in the bead aligning operation are solved by the present invention in that the power mechanism for pressing the beads together is detachable from the bead aligner, and brake means are provided to hold the bead aligner in bead compressing position yet permit self adjustment of the bead aligner when pressure is exerted by the inflation of the tire in the mold to move the beads apart uniformly and thus align the tire properly in the mold; in this manner not only the portable power equipment is removable and can be used on several bead aligners, but even the bead aligners themselves after the tire is properly aligned in the mold can be easily detached and used for aligning another tire in another mold.

We are aware that some changes may be made in the general arrangements and combinations of the several devices and parts, as well as in the details of the construction thereof without departing from the scope of the present invention as set forth in the following specification, and as defined in the following claims; hence we do not limit our invention to the exact arrangements and combinations of the said device and parts as described in the said specification, nor do we confine ourselves to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 4 is a partly sectional view of the power mechanism positioned on the top bead aligner element.

FIG. 5 is a partly sectional view showing the power mechanism after the bead aligner elements are forced together.

FIG. 6 is a fragmental, sectional plan view of an embodiment of the top bead aligner element.

FIG. 7 is a sectional fragmental view of the top bead aligner element, the section being taken on lines 7—7 of FIG. 6.

FIG. 8 is a bottom plan view of the lower bead aligner element showing access slot and the anchor pin.

FIG. 9 is a fragmental top plan view of a modified form of the top bead aligner element partly in section.

FIG. 10 is a partly sectional fragmental view of the modified form of the bead aligner element.

FIG. 11 is a top plan view of the top bead aligner element.

Figure 1:
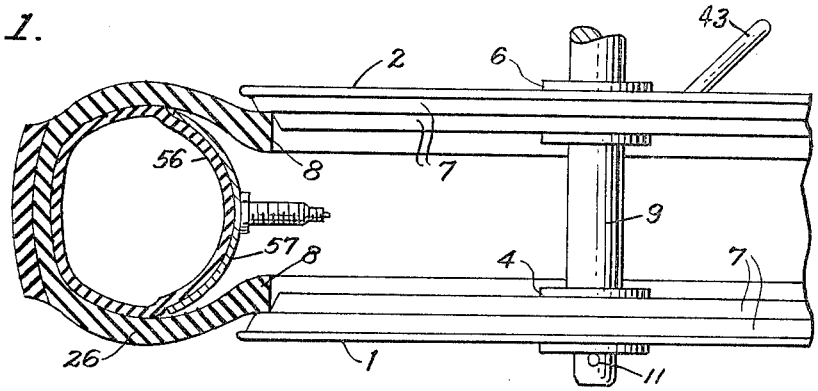
FIG. 1 is a schematic fragmental view showing the bead aligners placed upon the beads of a tire casing.

In the preferred form of the invention we provide a pair of opposite bead aligning elements 1 and 2. In the present form the lower bead aligning element 1 is in the form of a ring with spokes 3 connecting the ring to a hub 4. The upper bead aligning element 2 is also in the form of a ring of the same diameter as the lower element and is also provided with spokes 3 connecting to a hub 6. The upper ring is split to provide spaces 5 for insertion or withdrawal of an airhose for inflation of the tire in the mold. The rings are of considerable thickness and on their facing sides are provided with suitably shaped steps or shoulders 7 to conform to several standard size tire beads 8. An aligner shaft 9 slidably extends through the hub 6 of the upper element 1 and also through the hub 4 of the lower element 2 and it is anchored in the hub 4 of the lower element 2. In the present illustration a cross pin 11 extends across the end of the aligner shaft 9. When the aligner shaft 9 is suitably turned and the cross pin 11 is out of registry with an access slot 12 through the lower hub 4, it anchors the aligner shaft 9.

The top of the aligner shaft 9 has a suitable loop 13 thereon for engagement with a portable jack 14. The loop 13 is of larger diameter than the shaft diameter so as to prevent the total withdrawal of the shaft from the upper element 2. The jack 14 has a usual cylinder 16 with a piston 17 working in it as controlled by a suitable trigger valve 18 on a handle 19 on the cylinder 16. The piston rod 21 of the piston 17 projects into an elongated channel brace 22 and it has a hook 23 thereon for hooking into the loop 13 on the aligner shaft 9. The longitudinal opening 24 of the channel brace 22 fits over the aligner shaft 9 so that it may be pressed against the top of the hub 6 as the hook 23 is hooked into the aligner shaft loop 13. By working the piston 17 so as to exert a relative pull on the aligner shaft 9 and correspondingly press the channel brace 22 against the hub 6, the upper element 2 is pressed downwardly toward the lower element 1 and the lower element 1 is pulled toward the upper element 2, thereby compressing the tire beads 8 of the tire 26 uniformly toward on another.

The elements 1 and 2 are held in the bead aligning position by a brake device 31 provided in the upper hub 6.

In the form shown in FIGS. 4 to 8 the aligner shaft 9 is cylindrical. In the hub 6 is provided a split steel tube 32 with a plastic tube lining 33 to form the brake shoe around the aligner shaft 9 in the center of the hub 6.

An ear 34 extends from each end of the split steel tube 32 into a recess 36 in a boss 37 on the hub 6. Leaf springs 35 between the ears 34 normally urge the ears 34 apart. One of the ears 34 is engaged from the outside by a set screw 38 threaded into the boss 37 for the adjustment of tension. The other ear 34 is engaged by a slidable pressure bar 39 in the boss 37. Outside of the pressure bar 39 in the boss 37 is journalled an eccentric cam 41 on a transverse pivot so that the periphery of the cam 41 bears against the pressure bar 39. The cam 41 is pivoted on a suitable shoulder screw 42 secured in the boss 37. A handle 43 extends from the cam periphery for turning the cam 41 so that when the eccentric portion of the cam 41 bears against the pressure bar 39 it presses the adjacent ear 34 toward the other ear and thereby presses the brake shoe against the aligner shaft 9 with sufficient force to create friction to hold the bead aligning elements 1 and 2 in the adjusted position. The set screw 38 is preadjusted so that the applied brake shoes resist normal pressures on the beads but above a predetermined pressure allow the sliding of the aligner shaft 9 and thus allow the beads to move apart when the tire is inflated.

In the modified form shown in FIGS. 9 and 10 the aligner shaft 46 is a square shaft. In a recess 47 on each of opposite sides of the aligner shaft 46 and in the hub 48 is provided a brake plate 49, with a shoe lining 51 on each brake plate 49 bearing against the respective opposite sides of the jack shaft 46. A set screw 52 is threaded into the hub 48 and bears against one of the brake plates 49. A suitable handle 53 on the outside end of the set screw 52 facilitates the turning of the set screw 52 to tighten the brake to the desired extent. As the handle 53 is turned it bears against the adjacent brake plate 49 and the pressure so applied presses the square aligner shaft 46 against the other brake shoe 51 and brake plate 49 creating the frictional resistance to resist the resiliency of the beads from forcing the elements 1 and 2 apart until the force exerted on and by the beads exceeds the frictional resistance created by the brake.

Figure 2:
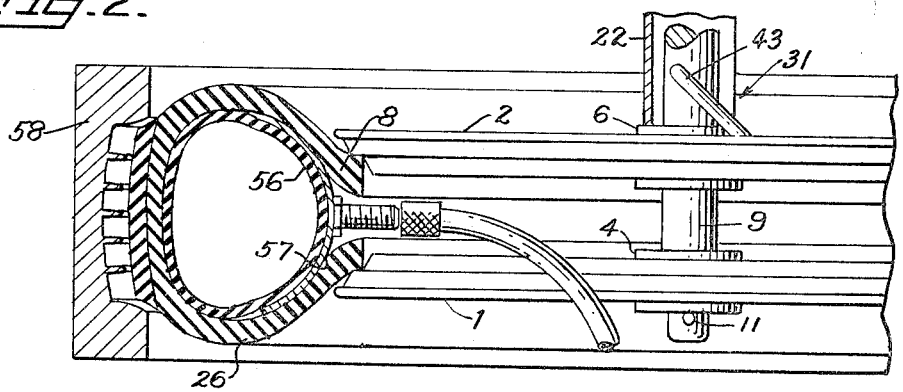
FIG. 2 is a fragmental, schematic view showing the bead aligners compressed by the power mechanism and locked.
Figure 3:
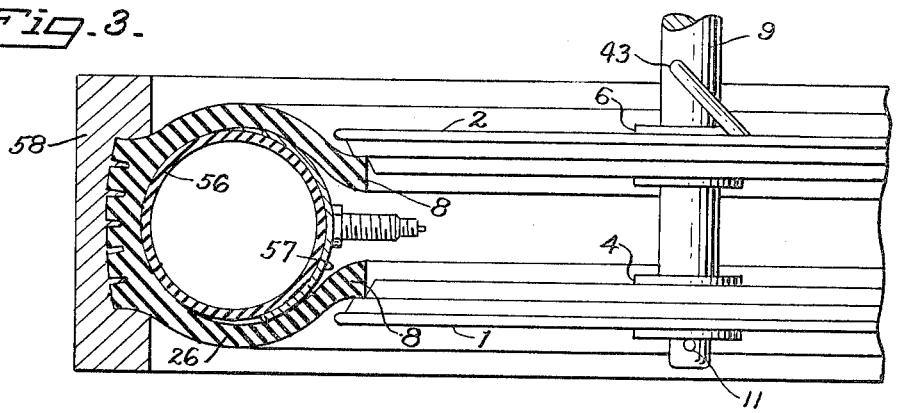
FIG. 3 is a fragmental schematic view showing the bead aligners forced apart by the inflation of the tire in the mold.

In operation first a usual curing tube 56 and inner rim 57 is inserted in the tire 26. Then the lower aligning element 1 is placed on some support such as a table, then the tire 26 is placed on the lower bead aligning element 1 so that the lower bead 8 of the tire 26 rests in the suitable step portion 7 of the lower element. Then the aligner shaft 9 or 46 is inserted and anchored in the lower bead aligning element 1 by its cross pin 11. The upper bead aligning element 2 is positioned on the upper bead as the aligner shaft 9 is inserted and anchored, as shown in FIG. 1. Then the power jack is placed on the top of the hub 6 so that its hook 23 is hooked to the loop 13 of the aligner shaft 9 or 46 and the end of the channel brace 22 bears against the top of upper hub 6 around the respective jack shaft 9 or 46. Then the power equipment is actuated by the trigger valve 18 to exert the required opposite forces to pull on the aligner shaft 9 or 46 and press on the hub 6 so as to compress the tire beads 8 together as shown in FIG. 2, thereby to reduce the tire diameter sufficiently to insert the tire into a suitable curing mold 58, keeping the beads properly aligned. Then the brake device is set by turning the handle 43 to turn the cam 41 so as to press the pressure bar 39 against the ear 34 of the resilient steel tube 32, as shown in FIG. 2. In the second form the handle 53 is turned to set the set screw against the adjacent brake plate 49 so as to apply the desired brake pressure on the aligner shaft 46. Then the trigger valve 18 is operated to release the pressure in the cylinder 16 and allow the withdrawal of the power jack 14 from the top aligning element 2 leaving the bead aligner in properly operating position. Thereafter the same power jack 14 can be similarly applied to other similar bead aligners of the type herein described. Then the tire with the compressed beads and the bead aligner thereon is inserted into the mold 58, whenever such mold is vacated, and the curing tube 56 is inflated within the tire 26 in the mold 58. The force of inflation overcomes the friction of the brake device and pushes the beads and the aligner elements apart gradually and uniformly, keeping the beads and the tire correctly centered in the mold 58. After complete inflation the brake device is released and the aligner shaft is turned and withdrawn from the lower element 1. Thus both elements are removed from the tire and can be assembled on another tire to get it ready for another mold and curing operation. By the use of the herein invention a single power jack can quickly set numerous pairs of aligner elements on the beads and prepare a number of tires ready for introduction in a mold as soon as such mold is available. As soon as the tire is inflated and aligned within the mold the aligner beads are again available for contracting and aligning another tire.

We claim:
1. In a tire bead aligner
   (a) a pair of spaced bead aligning elements fitting respectively on the opposite beads of a tire
   (b) an aligner shaft extended through the centers of said bead aligning elements
   (c) means to anchor said aligner shaft in one of said bead aligning elements
   (d) friction brake means in the other bead aligning element slidably engageable with the aligner shaft to hold the bead aligning elements on said aligner shaft in adjusted position
   (e) and releasable means to apply said brake means at will.
2. In a tire bead aligner as described in chain 1, and
   (f) means on said brake means to predetermine the force of engagement between the brake and the aligner shaft.
3. In a tire bead aligner as described in claim 1, and
   (f) a releasable and detachable jack device for pressing said elements together including
   (g) a brace member bearing against the bead aligning element having the brake therein
   (h) a pulling member longitudinally movable relatively to said brace member
   (i) detachably engageable coacting means on the pulling member and on the aligner shaft to exert a reaction force on the aligner shaft in a direction opposite to the pressure exerted by said brace member on said bead aligning element having the brake therein, thereby to uniformly force said bead aligning elements together
   (j) manipulable means to apply power to said jack device for exerting said pressure and pulling force.
4. In a tire bead aligner as described in claim 3, and coacting means including
   (k) a loop on the end of said aligner shaft and
   (l) a hook on the pulling member of the jack device.
5. In a tire bead aligner as described in claim 3, and said coacting means including
   (k) a loop on the end of said aligner shaft
   (l) a hook on the pulling member of the jack device
   (m) said pressure member being in the form of a channel fitting around said aligner shaft.
6. In a tire bead aligner as described in claim 1, and said brake means including
   (f) a split brake shoe surrounding said aligner shaft
   (g) a brake lining between said brake shoe and said aligner shaft
   (h) ears on the ends of said brake shoe
   (i) an eccentric cam device in the adjacent bead aligner being manipulable to exert pressure against said ears to apply said brake shoe against said aligner shaft.
7. In a tire bead aligner as described in claim 1, and
   (f) a pair of opposite brake shoes on opposite sides of said aligner shaft in the adjacent bead aligning element, and
   (g) manipulable means to exert pressure against one of said brake shoes to press the aligner shaft against the other brake shoe.
8. In a bead aligner device in combination having
   (a) a pair of spaced bead aligning elements
   (b) a shaft connecting said elements, said shaft being anchored in one bead aligning element and slidably extending through the other bead aligning element,
   (c) said elements being engageable with the opposite beads of a tire casing
   (d) brake means between said other bead aligning element and said shaft
   (e) a detachable power applying device including
   (f) a cylinder
   (g) a piston working in said cylinder

(h) a brace channel extended from said cylinder and insertable over said aligner shaft so as to bear against said other aligning element (i) a piston rod extended from said piston axially into said brace channel and engageable with said aligner shaft for exerting a pulling force on said aligner shaft as said brace channel is pressed against said other bead aligning element thereby to pull said bead aligning elements and the engaged beads together uniformly (j) and manipulable means to control the working of said piston in said cylinder at will.

References Cited by the Examiner

UNITED STATES PATENTS

| | | | |
|---|---|---|---|
| 2,948,924 | 8/1960 | Clapp | 18—18 |
| 2,989,779 | 6/1961 | White | 18—18 |
| 3,162,898 | 12/1964 | Fike | 18—18 |
| 3,195,179 | 7/1965 | Laube | 18—18 X |
| 3,200,443 | 8/1965 | Maddox et al. | 18—18 |
| 3,240,653 | 3/1966 | Mattox et al. | |

J. SPENCER OVERHOLSER, *Primary Examiner.*

J. HOWARD FLINT, *Examiner.*